United States Patent
Hayashi et al.

(10) Patent No.: US 7,250,693 B2
(45) Date of Patent: Jul. 31, 2007

(54) ELECTRONIC VEHICLE THEFT PREVENTIVE DEVICE

(75) Inventors: Masaki Hayashi, Aichi (JP); Hirokazu Shamoto, Aichi (JP); Masaki Yoshino, Aichi (JP); Toshihiro Nagae, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 376 days.

(21) Appl. No.: 10/433,749

(22) PCT Filed: Feb. 8, 2002

(86) PCT No.: PCT/JP02/01112

§ 371 (c)(1),
(2), (4) Date: Jun. 6, 2003

(87) PCT Pub. No.: WO02/062634

PCT Pub. Date: Aug. 15, 2002

(65) Prior Publication Data

US 2004/0046453 A1  Mar. 11, 2004

(30) Foreign Application Priority Data

Feb. 9, 2001 (JP) ............... 2001-033890
Oct. 19, 2001 (JP) ............... 2001-322815

(51) Int. Cl.
*H01H 47/22* (2006.01)
*E05B 17/00* (2006.01)

(52) U.S. Cl. .................. 307/10.2; 307/10.3
(58) Field of Classification Search ............ 307/10.2, 307/10.3, 10.5; 70/252
See application file for complete search history.

(56) References Cited

U.S. PATENT DOCUMENTS

| 4,209,709 A | 6/1980 | Betton |
| 4,345,665 A | 8/1982 | Föhl |
| 4,688,036 A | 8/1987 | Hirano et al. |
| 4,965,460 A * | 10/1990 | Tanaka et al. ............ 307/10.2 |
| 5,396,215 A | 3/1995 | Hinkle |
| 5,528,086 A | 6/1996 | Maass et al. |
| 5,595,257 A * | 1/1997 | Yoshida et al. ............ 180/287 |
| 5,623,245 A | 4/1997 | Gilmore |
| 5,654,689 A | 8/1997 | Peyre et al. |
| 5,677,665 A * | 10/1997 | Amano et al. ......... 340/426.35 |
| 5,818,330 A * | 10/1998 | Schweiger ............ 340/426.13 |
| 5,841,361 A * | 11/1998 | Hoffman .................... 340/5.54 |

(Continued)

FOREIGN PATENT DOCUMENTS

EP  0 733 522 A1  9/1996

(Continued)

*Primary Examiner*—Brian Sircus
*Assistant Examiner*—Michael Rutland-Wallis
(74) *Attorney, Agent, or Firm*—Crompton, Seager & Tufte, LLC

(57) ABSTRACT

A steering wheel lock apparatus having high reliability. The steering wheel lock apparatus (1) includes a lock pin (21), which engages a steering wheel (5), a motor (23), which moves the lock pin, and a control circuit (31), which controls the motor. The control circuit includes a power supply line (72*b*), which provides locking current to the motor for locking the steering wheel. A breaker circuit (61) selectively breaks the power supply line when a user operates an ignition switch knob (81) to start the vehicle.

11 Claims, 12 Drawing Sheets

U.S. PATENT DOCUMENTS

| | | | |
|---|---|---|---|
| 5,949,151 A * | 9/1999 | Nakajima | 307/10.3 |
| 6,108,188 A * | 8/2000 | Denison et al. | 361/160 |
| 6,400,041 B1 * | 6/2002 | Engelmann et al. | 307/10.2 |
| 6,548,915 B1 | 4/2003 | Geber et al. | |
| 2004/0090124 A1 * | 5/2004 | Geber et al. | 307/10.3 |

FOREIGN PATENT DOCUMENTS

| | | |
|---|---|---|
| JP | 59-014555 | 1/1984 |
| JP | 59-192646 | 11/1984 |
| JP | 1-147765 | 10/1989 |

\* cited by examiner

ELECTRONIC VEHICLE THEFT PREVENTIVE DEVICE

BACKGROUND OF THE INVENTION

The present invention relates to an automobile anti-theft apparatus, and more particularly, to an electronic anti-theft apparatus.

FIG. 15 is a prior art mechanical steering wheel lock apparatus 51 that prevents a vehicle from being stolen. The steering wheel lock apparatus 51 includes a key cylinder 54 and a lock pin 52. A mechanical key (not shown) is inserted in the key cylinder 54. The mechanical key is rotated to move the lock pin 51. When the lock pin 52 engages part of a steering mechanism, or a steering shaft 53, the rotation of the steering shaft 53 is prohibited. This disables turning of a steering wheel (not shown).

Electronic key systems, which start an engine without inserting a key in the cylinder 54, have become popular nowadays. Accordingly, an electronic steering wheel lock apparatus, which electrically controls an actuator, such as a motor, to lock a steering wheel, is manufactured. However, electrical noise may cause the electronic steering wheel lock apparatus to be actuated erroneously. Therefore, there is a demand for an electronic steering wheel lock apparatus having high reliability.

SUMMARY OF THE INVENTION

It is an object of the present invention to provide an electronic steering wheel lock apparatus having high reliability.

To achieve the above object, the present invention provides an electronic anti-theft apparatus for preventing theft of a vehicle. The apparatus includes a locking means for selectively locking a movable component that is operated when the vehicle is being driven, an actuator for moving the locking means, and a control circuit for controlling the actuator. The control circuit includes a first power supply line for supplying the actuator with unlocking current that unlocks the movable component, a second power supply line for supplying the actuator with locking current that locks the movable component and a breaker circuit arranged in the second power supply line for breaking the second power supply line when the vehicle is started.

In one perspective, the control circuit further includes an upstream switching device and a downstream switching device, which are arranged in the first power supply line, and a second switching device, which is arranged in the second power supply line. The actuator is connected to a node, between the upstream switching device and the second switching device, and to the downstream switching device.

It is preferred that the actuator be connected to a node, between the downstream switching device and the breaker circuit.

It is preferred that the breaker circuit include an cooperation member, which moves in cooperation with a switch knob operated by a user when starting the vehicle, and a movable contact, which is moved in accordance with the interlock member to selectively break the second power supply line.

It is preferred that in the first power supply line, the upstream switching device, the actuator, and the downstream switching device be connected in series, and in the second power supply line, the breaker circuit, the actuator, and the second switching device be connected in series.

In one perspective, the breaker circuit includes an electric switching device, which electrically opens and closes the second power supply line, and a drive circuit, which drives the electric switching device. The drive circuit opens the second power supply line when the vehicle is started by controlling the electric switching device and closes the second power supply line when the vehicle is stopped by controlling the electric switching device.

In one perspective, the control circuit includes a computer that provides a drive permission signal to the drive circuit when starting of the vehicle is enabled. The drive circuit outputs the drive permission signal and an activation signal to the electric switching device in accordance with an ignition signal indicating a driving state of the vehicle.

It is preferred that the breaker circuit be a mechanical switch that mechanically opens the second power supply line when the vehicle is being driven.

DETAILED DESCRIPTION OF THE PREFERRED EMBODIMENTS

In the following description, the phrase "when a vehicle is being driven" is a state satisfying at least one of the conditions in which a shift lever is not at a parking position, an engine is running, a functional position is in an "ON" position, and starting of the engine is enabled.

The phrase "starting of the engine is enabled" refers to, for example, when an ID code registered in a portable device, which is possessed by an authorized owner of the vehicle (user), coincides with an ID code, which is registered in the vehicle, and when an authorized mechanical key is inserted in a key cylinder of the vehicle.

First Embodiment

An electronic anti-theft apparatus according to a first embodiment of the present invention will now be described with reference to FIGS. 1 to 3. The anti-theft apparatus locks movable components 5, which move when a vehicle is being driven. The movable components 5 include, for example, a steering shaft 5, a wheel, and a shift lever.

Figure 1:
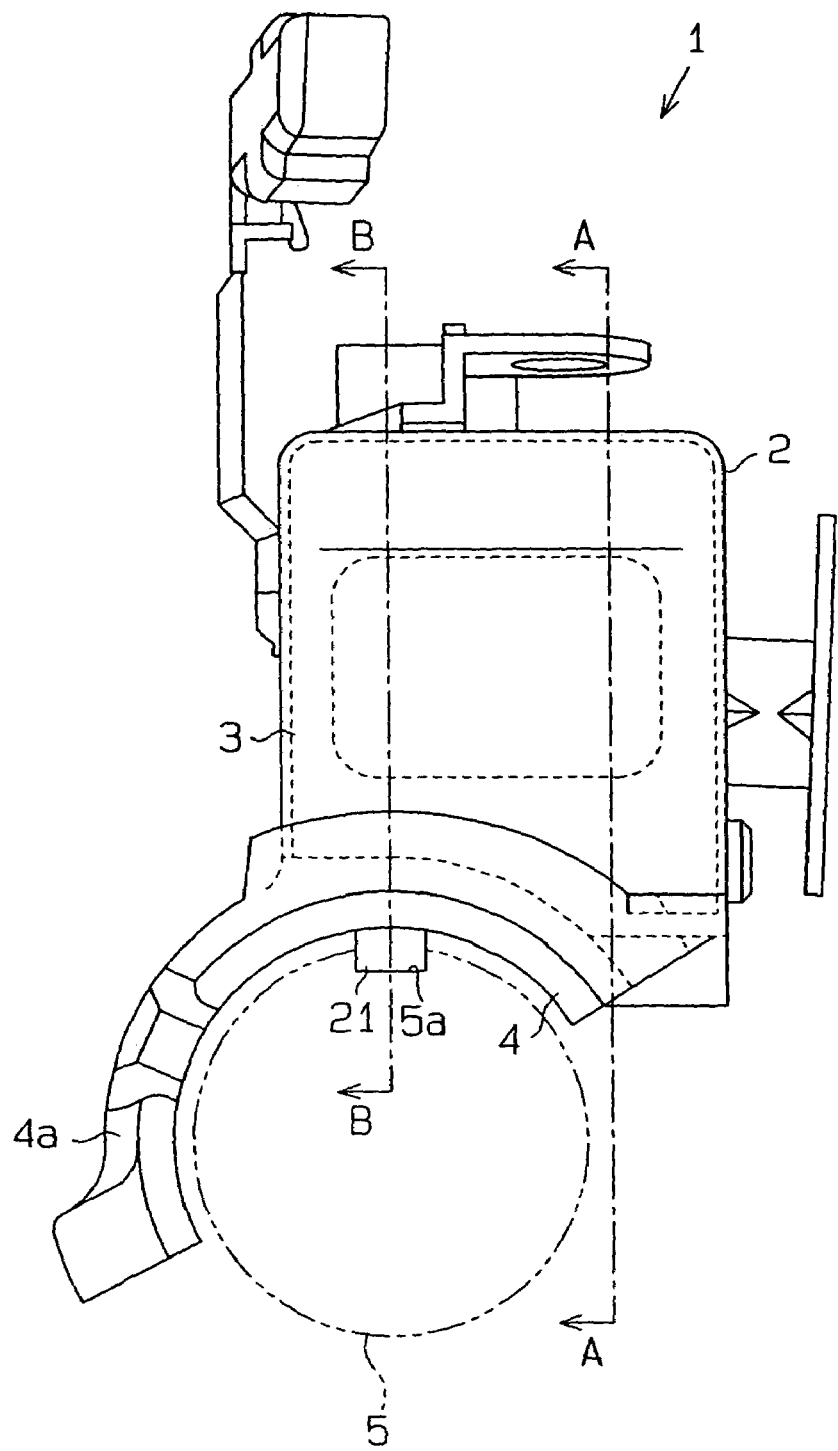
FIG. 1 is a side view of an electronic steering wheel lock apparatus according to a first embodiment of the present invention.
Figure 2:
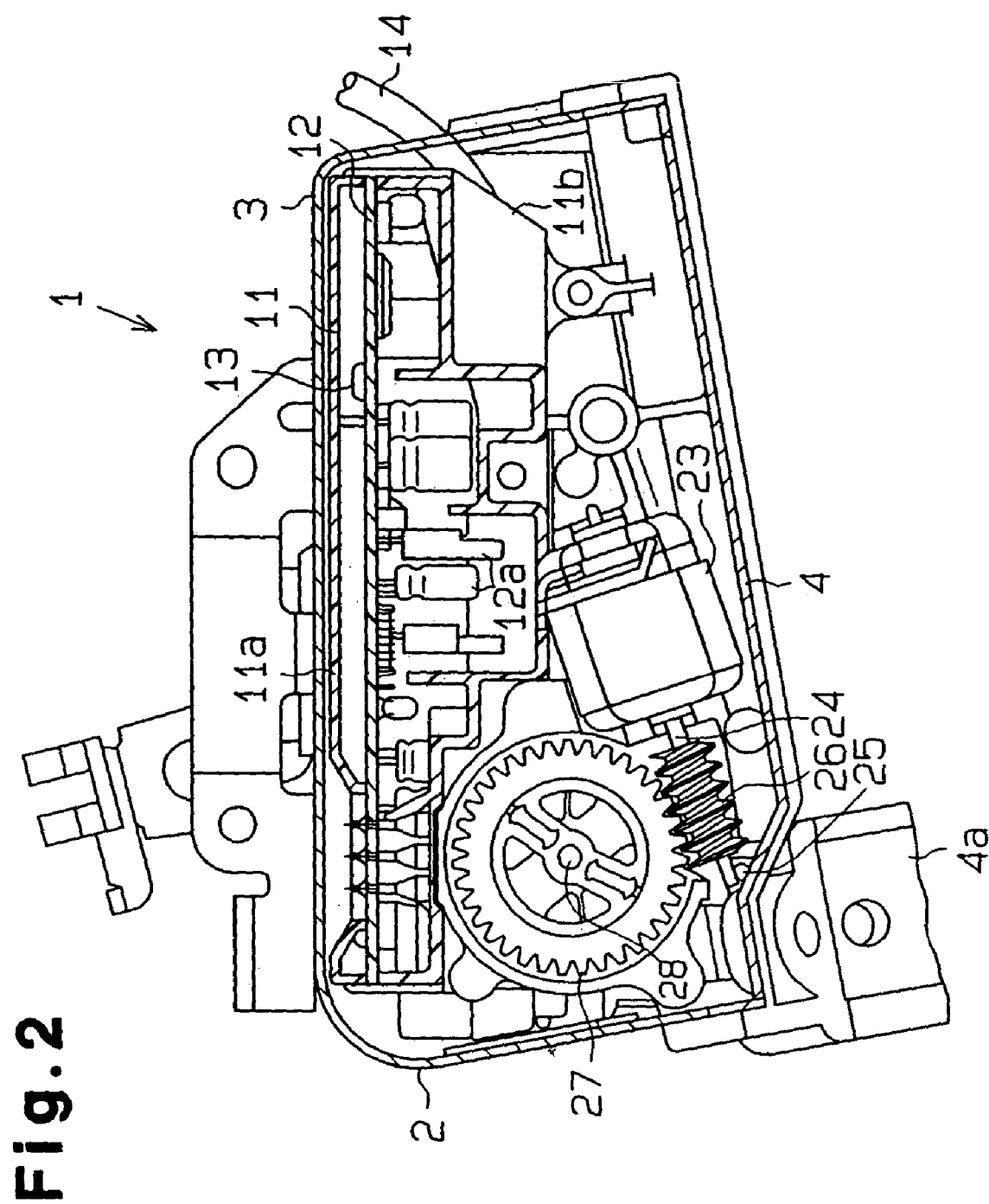
FIG. 2 is a cross-sectional view taken along line A-A in FIG. 1.
Figure 3:
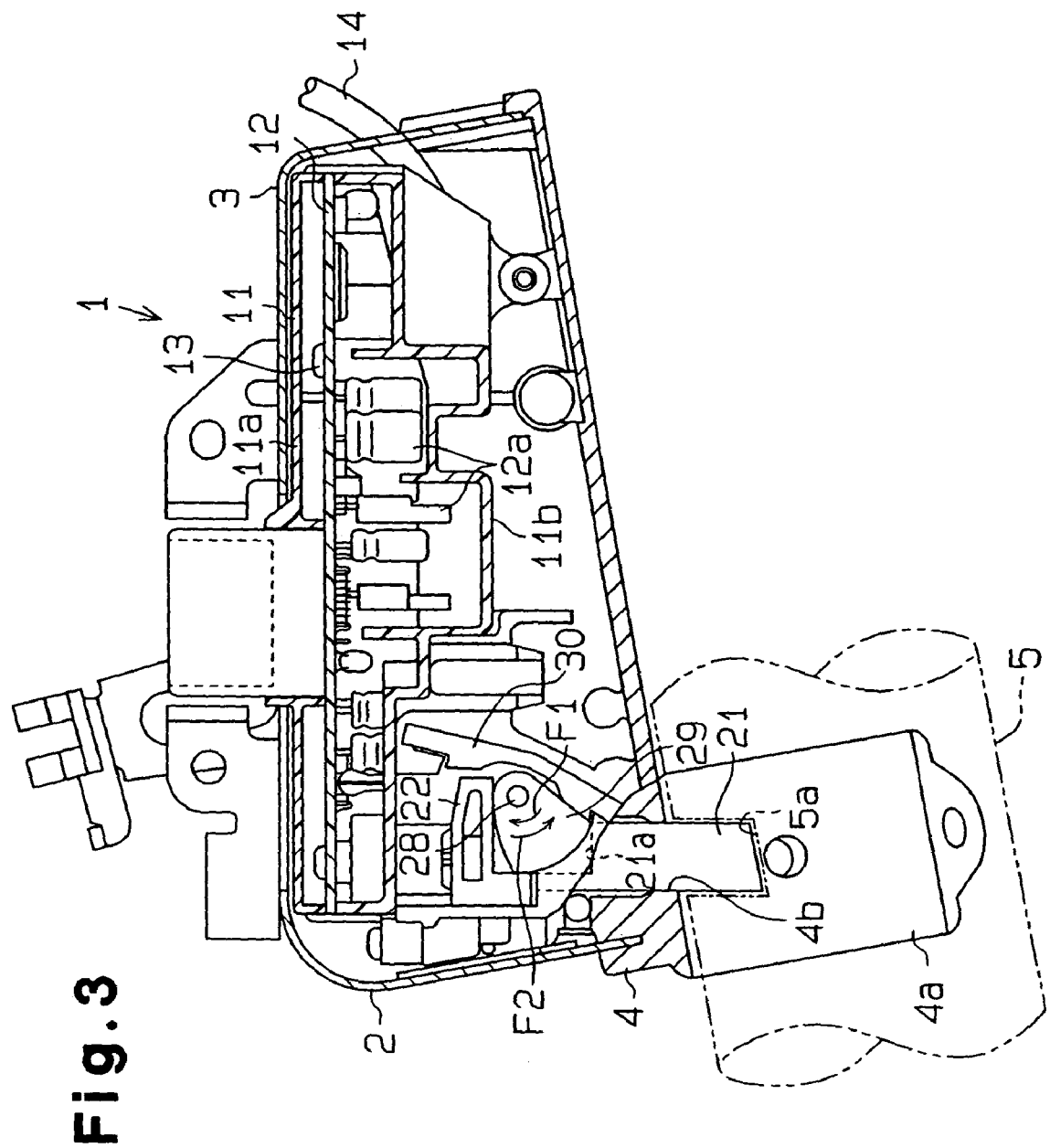
FIG. 3 is a cross-sectional view taken along line B-B in FIG. 1.

Referring to FIGS. 1 to 3, a steering wheel lock apparatus 1 is installed in a steering post (not shown). The steering wheel lock apparatus 1 has a box-like case body 2. The case body 2 is formed by attaching a cover 3 to a lock body 4.

As shown in FIGS. 2 and 3, a retaining case 11, which is made of synthetic resin, is arranged on an inner side of the cover 3. The retaining case 11 is formed by joining a first case 11a and a second case 11b. A printed circuit board 12 is retained in the retaining case 11. The printed circuit board 12 is fixed to the second retaining case 11b by a screw 13. A plurality of electric components 12a of an actuator ECU 31 are arranged on multiple positions of the printed circuit board 12. The plurality of electric components 12a electrically connect the printed circuit board 12 to an electric wire 14, which extends out of the case body 2.

A generally arcuate coupling portion 4a is arranged on a left end of the lock body 4, as viewed in FIG. 1. The coupling portion 4a is coupled to a column tube by a bolt (not shown). A movable component, or a steering shaft 5, which is part of a steering mechanism of the vehicle, is inserted through the column tube. A socket 5a is formed in the outer surface of the steering shaft 5. As shown in FIG. 3, the lock body 4 has a guide hole 4b, which has a generally rectangular cross section. The guide hole 4b is located at a position corresponding to the coupling portion 4a. When the case body 2 is attached to the column tube, the guide hole 4b is communicated with the interior of the column tube.

Referring to FIG. 3, a lock pin 21, or a locking means, is movable along the guide hole 4b in the guide hole 4b. The lock pin 21 is a generally rectangular cylinder. When the lock pin 21 projects from the outer surface of the lock body 4, the distal end of the lock pin 21 engages the socket 5a. A pressed portion 21a and a retracting stopper 22 are arranged at the proximal portion of the lock pin 21.

As shown in FIG. 2, an actuator, or a motor 23, is retained in the case body 2. A slide pin 25 comes into contact with the distal end of a first shaft 24 of the motor 23. A plate cam 40 rotates with the first shaft 24. The slide pin 25 positions the first shaft 24. A worm gear 26, which is fixed to the first shaft 24, rotates with the first shaft 24. The worm gear 26 is meshed with a spur gear 27 to drive the spur gear 27. The spur gear 27 rotates about the second shaft 28.

As shown in FIG. 3, a triangular cam 29 is fixed to the second shaft 28. The cam 29 rotates about the second shaft 28 in a clockwise direction as indicated by arrow F1 when the motor 23 is rotated in a forward direction. The cam 29 rotates about the second shaft 28 in a counterclockwise direction as indicated by arrow F2 when the motor 23 is rotated in a reverse direction. The cam 29 rotates in the same direction as the spur gear 27. Therefore, when the cam 29 is rotated in the direction indicated by arrow F1, the cam 29 presses the retracting stopper 22 to disengage the distal end of the lock pin 21 from the socket 5a. When the cam 29 is rotated in the direction indicated by arrow F2, the cam 29 presses the pressed portion 21a to engage the distal end of the lock pin 21 with the socket 5a. That is, when the motor 23 is being driven, the cam 29 rotates by means of the worm gear 26 and the spur gear 27. Accordingly, if force is applied to the lock pin 21 in a direction, in which the lock pin 21 is engaged with or disengaged from the socket 5a when the motor 23 is not being driven, the rotation of the spur gear 27 is restricted by the worm gear 26 and the movement of the lock pin 21 is prohibited. In other words, the lock pin 21 is engaged with the socket 5a only by driving the motor 23. Therefore, the driving mechanism of the lock pin 21 is a self-holding mechanism, which holds the lock pin 21 and the socket 5a in the engaged state or disengaged state when the motor 23 is not being driven. Although the self-holding mechanism is formed by the worm gear 26, the spur gear 27, and the cam 29, the driving mechanism of the lock pin 21 is not limited to such a structure. Further, the rotating range of the cam 29 is restricted when the cam 29 comes into contact with a rubber stopper 30.

Figure 4:
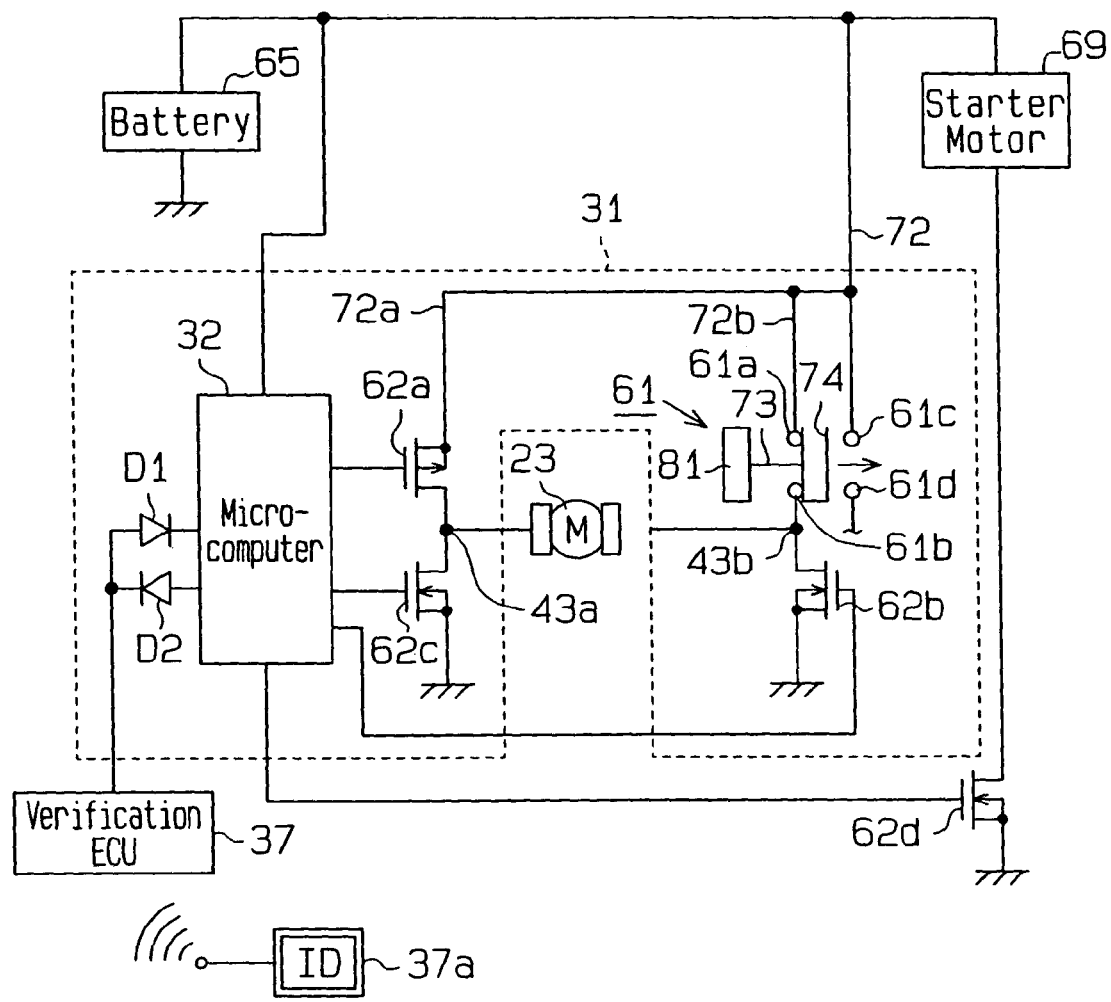
FIG. 4 is a block diagram showing an electric circuit of the steering wheel lock apparatus of FIG. 1.

The motor 23, which drives the cam 29, is controlled by a control circuit, or an actuator ECU 31. A verification ECU 37 is connected to the actuator ECU 31, as shown in FIG. 4. The verification ECU 37 performs mutual communication with a portable device 37a, which is possessed by a user, and compares an ID code set in the portable device 37a and an ID code set in the verification ECU 37. The verification ECU 37 permits the engine to start when the ID code in the portable device 37a coincides with the ID code in the verification ECU 37, and prohibits the engine from starting when the two ID codes do not coincide with each other.

The verification ECU 37 outputs a drive request signal that includes an unlocking code to the actuator ECU 31 when the ID codes coincide with each other. The verification ECU 37 outputs the drive request signal that includes a locking code to the actuator ECU 31 when the ID codes do not coincide with each other. It is preferred that the drive request signal be encoded.

The actuator ECU 31 includes a microcomputer 32. As shown in FIG. 4, the computer 32 and a starter motor 69, which starts an engine, are electrically connected to a battery 65. The starter motor 69 is actuated by power supplied from the battery 65 to start the engine. The starter motor 69 is connected to the drain terminal of field-effect transistor (FET) 62d. The gate terminal of the FET 62d is connected to the computer 32, and the source terminal of the FET 62d is grounded.

The microcomputer 32 is connected to the verification ECU 37 via two diodes D1 and D2. More specifically, the cathode terminal of the diode D1 and the anode terminal of the diode D2 are connected to the computer 32, and the anode terminal of the diode D1 and the cathode terminal of the diode D2 are connected to the verification ECU 37. The drive request signal of the verification ECU 37 is input to the computer 32 via the diode D1. The computer 32 outputs an activation signal to the FETs 62a and 62b in response to the drive request signal.

The battery 65 is electrically connected to a power supply line 72 of the actuator ECU 31. More specifically, the battery 65 is electrically connected to the source terminal of an upstream switching device, or the FET 62a. The gate terminal of the FET 62a is connected to the computer 32. The drain terminal of the FET 62a is connected to the drain terminal of a downstream switching device, or the FET 62*c*. The gate terminal of the FET 62*c* is connected to the computer 32, and the source terminal of the FET 62*c* is grounded. The FET 62*c* is activated in response to the activation signal, which is output from the computer 32 when the engine is stopped.

The battery 65 is electrically connected to a contact 61*a* of a breaker circuit, or an erroneous rotation prevention switch 61. The contact 61*b* of the erroneous rotation prevention switch 61 is connected to the drain terminal of a downstream switching device, or the FET 62*b*. The gate terminal of the FET 62*b* is connected to the computer 32, and the source terminal of the FET 62*b* is grounded. The drain terminal of the FET 62*a* is electrically connected to the drain terminal of the FET 62*c* via a node 43*a*. The contact 61*b* of the erroneous rotation prevention switch 61 is electrically connected to the drain terminal of the FET 62*b* via a node 43*b*. In other words, the motor 23 is connected to the node 43*a*, which is between the upstream FET 62*a* and the second FET 62*c*, and the node 43*b*, which is between the erroneous rotation prevention switch 61 and the downstream FET 62*b*. The FETs 62*a* to 62*c*, the erroneous rotation prevention switch 61, and the motor 23 configure a full bridge.

The verification ECU 37 communicates with the portable device 37*a* and compares the ID code included in a transmission signal from the portable device 37*a* and the ID code prestored in the verification ECU 37. When the two ID codes coincide with each other, the verification ECU 37 outputs an unlocking signal. The computer 32 outputs an activation signal to the FETs 62*a* and 62*b* in response to the unlocking signal to activate the FETs 62*a* and 62*b*.

A first power supply line 72*a* connects the upstream FET 62*a*, the downstream FET 62*b*, and the motor 23. In the first power supply line 72*a*, the motor 23 is connected between the FETs 62*a* and 62*b*. In other words, in the first power supply line 72*a*, the FET 62*a*, the motor 23, and the FET 62*b* are connected in series. When the FETs 62*a* and 62*b* are activated, the second shaft 28 is rotated in the direction indicated by arrow F1. That is, unlocking current flows through the first power supply line 72*a* to disengage the lock pin 21 from the steering shaft 5 by rotating the motor 23 in the forward direction.

A second power supply line 72*b* connects the erroneous rotation prevention switch 61, the motor 23, and the FET 62*c*. The motor 23 is connected between the erroneous rotation prevention switch 61 and the FET 62*c* in the second power supply line 72*b*. In other words, in the second power supply line 72*b*, the erroneous rotation prevention switch 61, the motor 23, and the FET 62*c* are connected in series. Locking current flows through the second power supply line 72*b* to engage the lock pin 21 with the steering shaft 5 by rotating the motor 23 in the reverse direction.

Figure 5A:
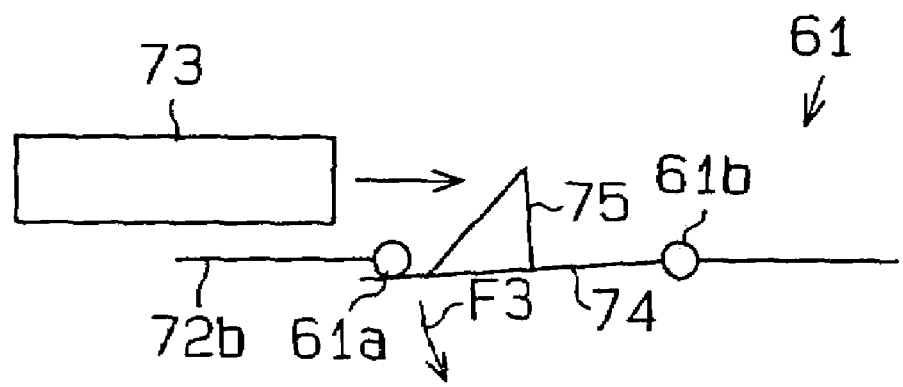
FIG. 5A and FIG. 5B are schematic diagrams of an erroneous rotation prevention switch.
Figure 5B:
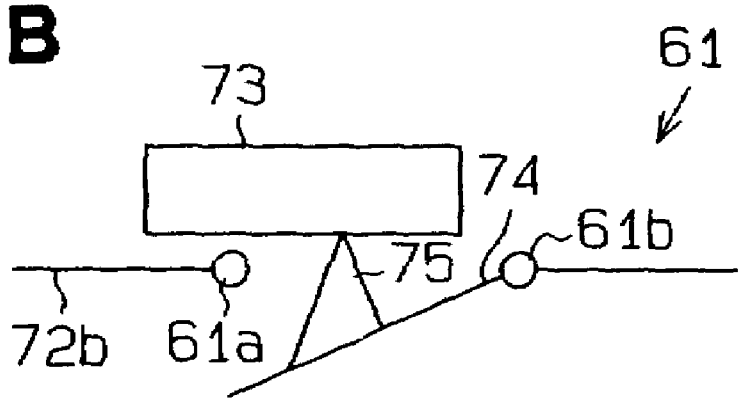

Referring to FIGS. 4, 5A, and 5B, the erroneous rotation prevention switch 61 mechanically breaks the second power supply line 72*b* when the vehicle is being driven. The erroneous rotation prevention switch 61 switches the motor 23 between an activated state and a deactivated state. As shown in FIG. 5A, the erroneous rotation prevention switch 61 includes a cooperation rod 73 and a movable contact 74. The cooperation rod 73 moves in cooperation with the operation of an ignition switch knob 81 shown in FIG. 4. The ignition switch knob 81 is operated by a user when starting an engine of a vehicle. Further, a generally triangular operation portion 75 is arranged on the movable contact 74. The operation portion 75 is pressed by the distal end of the cooperation rod 73 to pivot the movable contact 74 relative to the contact 61*b* in a direction indicated by arrow F3 in FIG. 5A. This deactivates the second power supply line 72*b*. In this case, it is preferred that the movable contact 74 contact the two contacts 61*c* and 61*d* so that activation current be supplied to vehicle electric devices. The movable contact 74 may be switched in response to the insertion of the mechanical key.

The operation of the electronic steering wheel lock apparatus 1 will now be described.

The verification ECU first compares the ID code included in the transmission signal from the portable device 37*a* with the ID code registered in the verification ECU 37. The verification ECU 37 provides the computer 32 with the drive request signal that includes the unlocking code when the two ID codes coincide with each other. In response to the drive request signal, the computer 32 outputs the activation signal to the FETs 62*a* and 62*b* to activate the FETs 62*a* and 62*b* and deactivate the FET 62*c*.

Subsequently, when starting the engine, a user operates and activates the ignition switch knob 81. The cooperation rod 73 is moved in cooperation with the operation of the switch knob 81. Referring to FIG. 5A, the cooperation rod 73 presses the operation portion 75. The operation portion 75 moves the movable contact 74 in a direction indicated by arrow F3. This breaks the second power supply line 72*b*, as shown in FIG. 5B. In this state, only the first power supply line 72*a* is activated. Therefore, the motor 23 is rotated in the forward direction to rotate the cam 29 about the second shaft 28 in the direction indicated by arrow F1. This disengages the lock pin 21 from the socket 5*a* and enables the rotation of the steering shaft 5 and the steering wheel. In this state, the computer 32 activates the FET 62*d* to actuate the starter motor 69 and start the engine.

If electrical noise is produced when the engine is running, the computer 32 may erroneously output the activation signal to the FET 62*c*. However, since the second power supply line 72*b* is broken by the erroneous rotation prevention switch 61, the rotation of the motor 23 is prohibited. This prevents the lock pin 21 from erroneously engaging the socket 5*a*.

When the ignition switch knob 81 is operated to stop the engine, the ignition switch knob 81 and the cooperation rod 73 return to the original position (the position indicated in FIG. 5A). Then, the erroneous rotation prevention switch 61 connects both contacts 61*a* and 61*b* again. The computer 32 outputs an activation signal to the FET 62*c* to activate the FET 62*c*. As a result, current flows through the second power supply line 72*b*. Therefore, the motor 23 rotates in the reverse direction to rotate the cam 29 about the second shaft 28 in the direction indicated by arrow F2. As a result, the lock pin 21 engages the socket 5*a* to disable rotation of the steering shaft 5 and the steering wheel (not shown).

The first embodiment has the advantages as described below.

(1) When the ignition switch knob 81 is activated, that is, when the vehicle is being driven, the erroneous rotation prevention switch 61 opens the second power supply line 72*b* in a mechanical manner. This guarantees that the actuator ECU 31 is prevented from activating the motor 23 when electrical noise causes the computer 32 to output the activation signal to the FET 62 since locking current does not flow through the second power supply line 72*b*. This prevents the lock pin 21 from erroneously engaging the steering shaft 5 and improves the reliability of the electronic steering wheel lock apparatus 1.

(2) The electronic steering wheel lock apparatus 1 is a relatively simple electric circuit that is configured by the FETs 62a to 62c, the erroneous rotation prevention switch 61, the first power supply line 72a, and the second power supply line 72b. This reduces the manufacturing cost of the electronic steering wheel lock apparatus 1.

(3) The movement of the ignition switch knob 81 is transmitted to the cooperation rod 73 even if the ignition switch knob 81 and the cooperation rod 73 move in different directions. Accordingly, the movement of the ignition switch knob 81 or the mechanical key being transmitted to the movable contact 74 is guaranteed. This guarantees activation of the ignition switch knob 81.

(4) The erroneous rotation prevention switch 61 is upstream of the motor 23 in the second power supply line 72b and mechanically breaks the second power supply line 72b. Thus, locking current does not flow through the motor 23 in a manner in which electrical noise would activate the FET 62c when the FET 62c is upstream of the motor 23 in the second power supply line 72b. This further guarantees that the motor 23 is not activated. As a result, the second power supply line 72b is broken in a more reliable manner.

(5) The flow of current to the second power supply line 72b is broken by the erroneous rotation prevention switch 61, which operates cooperatively with the ignition switch knob 81, which is used when starting the engine. Therefore, another mechanism for mechanically breaking the activation of the second power supply line 72b is not required. This simplifies the operation for starting the engine. Further, since a mechanism for mechanically breaking the activation of the second power supply line 72b is omitted, the manufacturing cost of the electronic steering wheel lock apparatus 1 is reduced.

The steering wheel lock apparatus 1 according to second to sixth embodiments of the present invention will now be described focusing on differences from the first embodiment.

Second Embodiment

Figure 6:
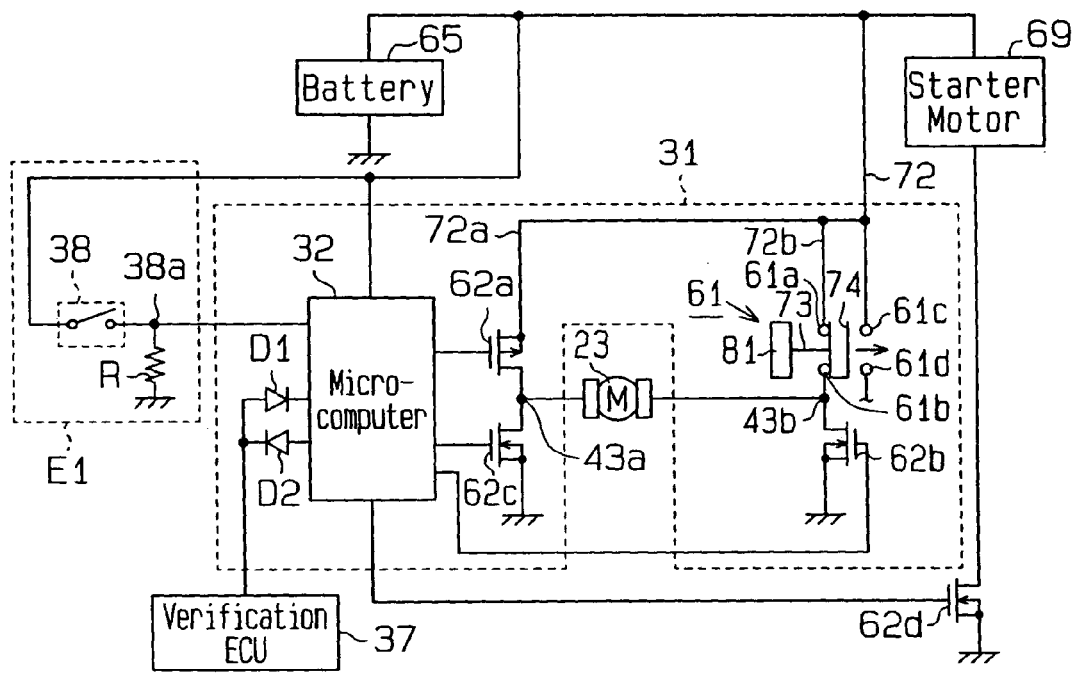
FIG. 6 is a block diagram showing an electric circuit of an electronic steering wheel lock apparatus according to a second embodiment of the present invention.
Figure 7A:
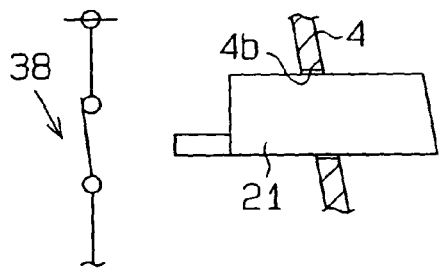
FIG. 7A and FIG. 7B are schematic diagrams of a lock position detection switch of the steering wheel lock apparatus in FIG. 6.
Figure 7B:
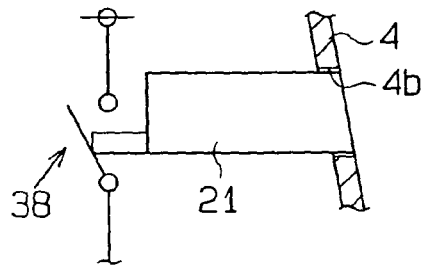

FIGS. 6 and 7 show a steering wheel lock apparatus 1 according to the second embodiment of the present invention. The steering wheel lock apparatus 1 of the second embodiment includes a lock position detection switch 38 and a resistor R, which are connected to the actuator ECU 31, as shown in FIG. 6. The lock position detection switch 38, which is a normal close type mechanical switch arranged in the vicinity of the proximal portion of the lock pin 21, is a limit switch in the second embodiment, as shown in FIG. 7. The lock position detection switch 38 is closed when the lock pin 21 projects from the guide hole 4b of the lock body 4, as shown in FIG. 7A. The lock position detection switch 38 is opened when the lock pin 21 is retained in the lock body 4, as shown in FIG. 7B. That is, the lock position detection switch 38 is closed when engaging the socket 5a of the steering shaft 5 and opened when disengaged from the socket 5a.

Referring to FIG. 6, the lock position detection switch 38 is connected to a node 38a between the grounded resistor R and the computer 32 and to the positive terminal of the battery 65. Therefore, the potential at the node 38a is input to the computer 32. The potential at the node 38a goes high when the lock position detection switch 38 is closed and goes low when the lock position detection switch 38 is opened. This enables the computer 32 to detect the opened or closed state of the lock position detection switch 38 based on the potential at the node 38a. The computer 32 stops providing a control signal to the FETs 62a to 62c when the potential at the node 38a changes. More specifically, the computer 32 stops the output of the control signal to the FET 62c when the lock pin 21 completes the engagement with the socket 5a. Further, the computer 32 stops the output of the control signal to the FETs 62a and 62b when the lock pin 21 is disengaged from the socket 5a. That is, the computer 32 stops driving the motor 23 when the opened or closed state of the lock position detection switch 38 changes.

The second embodiment has the advantage as described below.

(6) The computer 32 stops driving the motor 23 when the opened or closed state of the lock position detection switch 38 changes. That is, the computer 32 feedback controls the motor 23. Thus, the motor 23 is not continuously driven when the lock pin 21 has completed the engagement with the socket 5a or disengagement from the socket 5a. This reduces the load on the motor 23 and prolongs the life of the motor 23.

Third Embodiment

Figure 8:
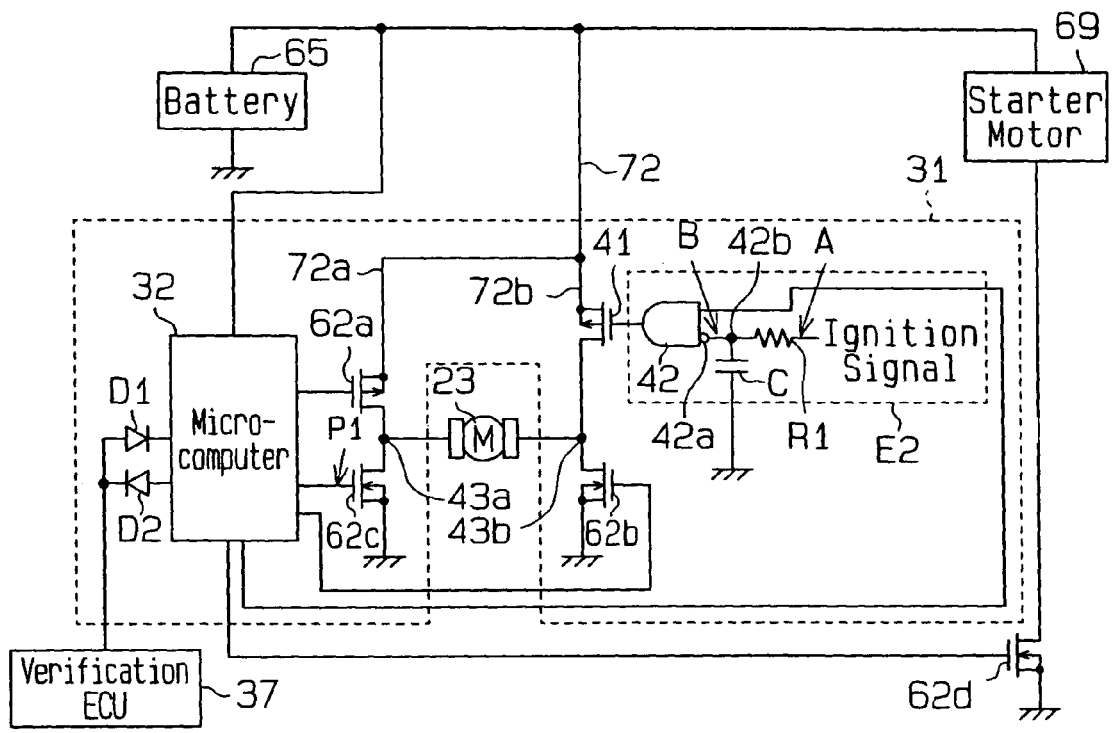
FIG. 8 is a block diagram showing an electric circuit of an electronic steering wheel lock apparatus according to a third embodiment of the present invention.
Figure 9:
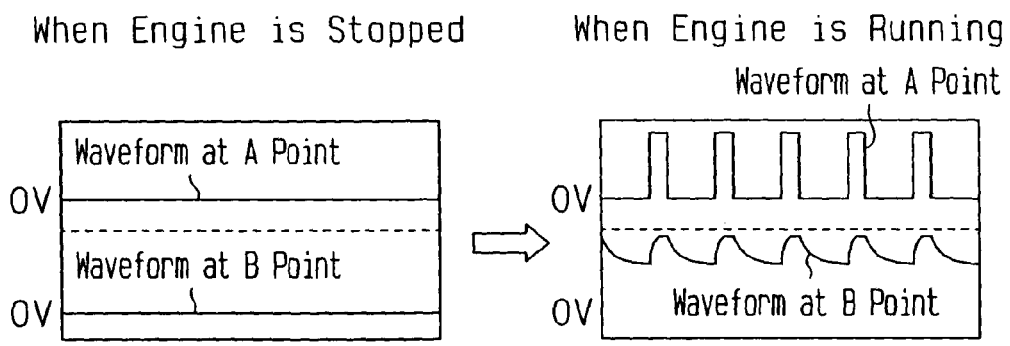
FIG. 9 is a waveform chart of an ignition signal received by an AND circuit of the steering wheel lock apparatus in FIG. 8.

A steering wheel lock apparatus 1 according to the third embodiment of the present invention is illustrated in FIGS. 8 and 9.

The third embodiment includes a breaker circuit having an electric switching device, which operates in accordance with an ignition signal, in lieu of the erroneous rotation prevention switch 61. More specifically, an n-channel power MOSFET (FET) 41, which serves as the electric switching device, is connected to the second power supply line 72b. The source terminal of the FET 41 is connected to the battery 65 and the drain terminal is connected to the node 43b. Further, a drive circuit E2 is connected to the gate terminal of the FET 41 to drive the FET 41. The drive circuit E2 includes a resistor R1, a capacitor C, an inverter 42a, and an AND circuit 42.

The resistor R1 receives an ignition signal, which indicates the driving state of the engine, from the detection circuit arranged in the engine (not shown). The capacitor C is connected to a node 42b between the resistor R1 and the inverter 42a and to the ground.

The AND circuit 42 has two input terminals, one of which is connected to the computer 32, and the other of which is connected to the resistor R1 and the capacitor C via the inverter 42a. The output terminal of the AND circuit 42 is connected to the gate terminal of the FET 41.

The computer 32 provides a high signal (drive permission signal) to the AND circuit 42 when the starting of the engine is permitted. The AND circuit 42 provides a high signal (activation signal) to the FET 41 when receiving the drive permission signal from the computer 32 and a low ignition signal. The FET 41 is activated in response to the activation signal. That is, the drive circuit E2 closes the second power supply line 72b when receiving the drive permission signal and the low ignition signal.

In a section indicated by arrow A in FIG. 8, the ignition signal has a low and flat waveform when the engine is not running and has a pulse waveform (ignition pulse) when the engine is running, as shown in FIG. 9. Further, the ignition signal is integrated by the resistor R1 and the capacitor C at the section indicated by arrow B in FIG. 8 when the engine is running to form a waveform, which remains high, as shown in FIG. 9. Accordingly, the AND circuit 42 outputs the activation signal only if the computer 32 inputs the drive permission signal when the engine is not running. Therefore, the FET 41 is activated only if the computer 32 outputs the drive permission signal when the engine is not running. That is, in the third embodiment, the breaker circuit includes the switching device (FET 41) and the drive circuit E2. The breaker circuit breaks the second power supply line 72b when the engine is running and connects the second power supply line 72b when the engine is not running.

The third embodiment has the advantages described below.

(7) The AND circuit 42 outputs the activation signal to the FET 41 only if the drive permission signal is received from the computer 32 when the engine is not running. Since the FET 41 is arranged in the second power supply line 72b, the driving of the motor 23 is enabled only when receiving the drive permission signal from the computer 32 when the engine is not running. This prohibits the motor 23 from being driven even if the computer 32 outputs the drive permission signal to the AND circuit 42 and outputs the high control signal to the FET 62c. Accordingly, even though the breaker circuit has an electronic configuration, the breaker circuit has the same reliability as one having a mechanical configuration. This guarantees prevention of an erroneous operation of the electronic steering wheel lock apparatus 1 caused by noise.

(8) The AND circuit 42 outputs the activation signal, which indicates the driving state of the engine, in accordance with the ignition signal. This guarantees prevention of erroneous actuation of the motor 23 when the engine is running.

Fourth Embodiment

Figure 10A:
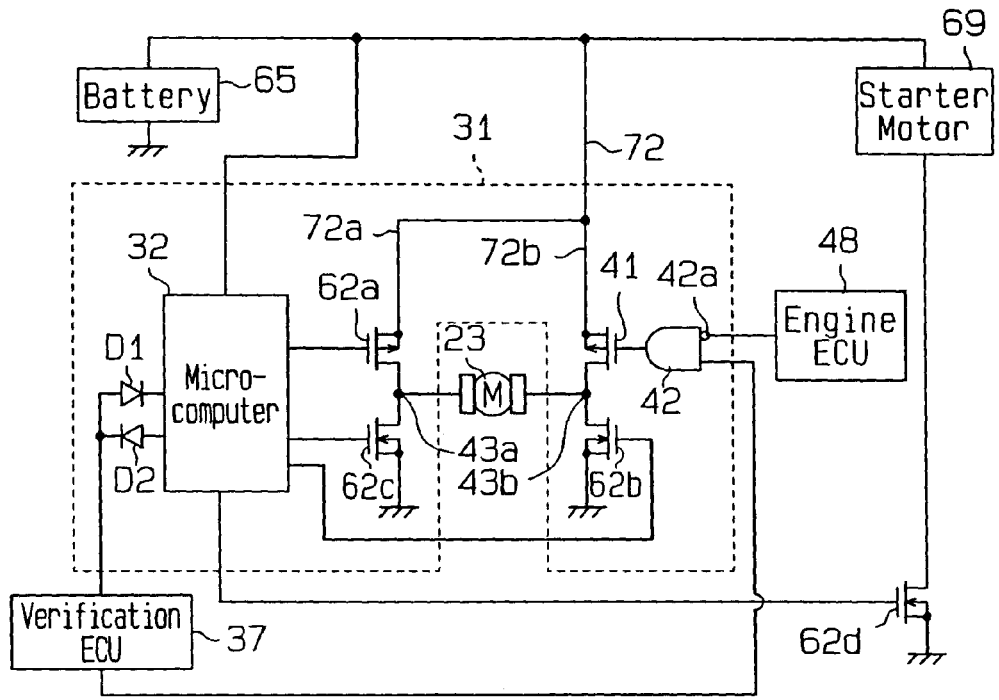
FIG. 10A is a block diagram showing an electric circuit of an electronic steering wheel lock apparatus according to a fourth embodiment of the present invention.

FIG. 10A shows a steering wheel lock apparatus 1 according to the fourth embodiment of the present invention.

In the fourth embodiment, a breaker circuit, which includes an electric switching device (FET) 41 activated in accordance with an output signal from the verification ECU 37 and the engine ECU 48, and the AND circuit 42, is used in lieu of the erroneous rotation prevention switch 61.

More specifically, the AND circuit 42 is connected to the gate terminal of the FET 41, as shown in FIG. 10A. The AND circuit 42 has input terminals, one of which is connected to the verification ECU 37 and the other of which is connected to the engine ECU 48 via the inverter 42a. The breaker circuit (the FET 41 and the AND circuit 42) breaks the second power supply line 72b when the starting of the engine is enabled, and connects the second power supply line 72b when the starting of the engine is disabled.

Figure 10B:
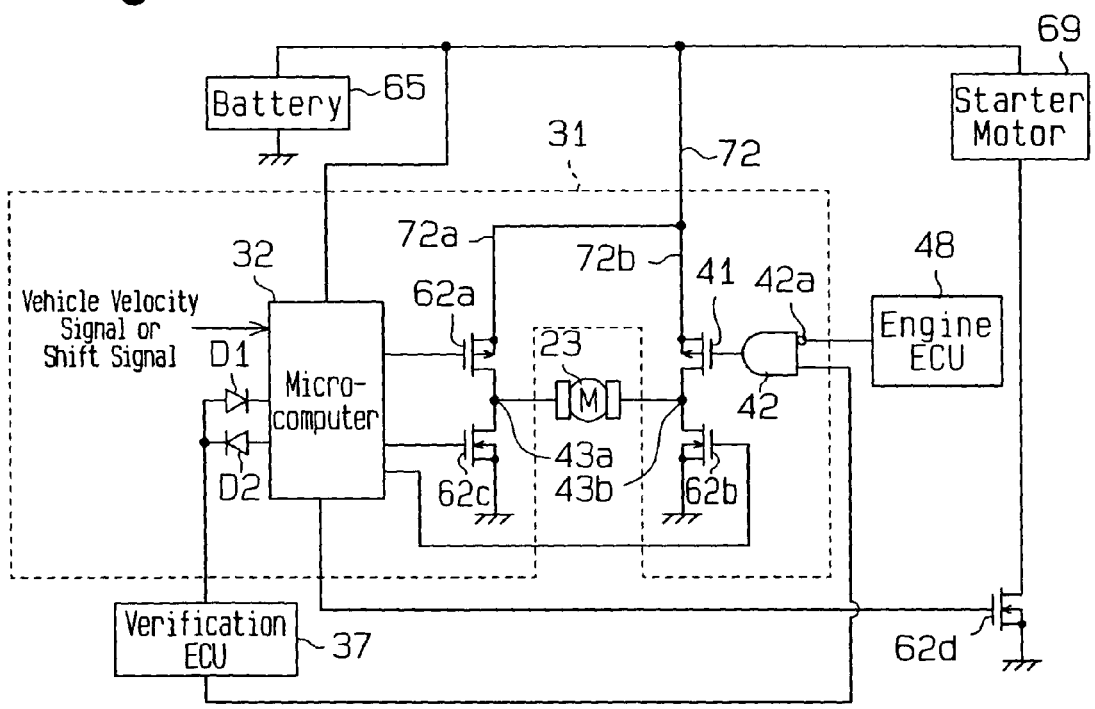
FIG. 10B is a modification of an electric circuit of FIG. 10A.

Referring to FIG. 10B, a vehicle velocity signal and a shift signal may be input to the computer 32. When the vehicle velocity is not null, that is, when the vehicle is traveling, or when a shift lever is not located at the parking position, the output of the activation signal to the FET 62c from the computer 32c may be impeded. In such a case, the motor 23 is not actuated in a direction engaging the lock pin 21 with the socket 5a since the FET 62c is not activated even when the ECUs 37 and 48 are erroneously activated and the FET 41 is activated. Accordingly, the actuator ECU 31 does not drive the motor 23 when the vehicle is traveling or when the shift lever is located at a position other than the parking position. This guarantees prevention of erroneous operation of the electronic steering wheel lock apparatus 1 when the vehicle is traveling.

The FET 41 is activated in accordance with the output signal, which is output from the verification ECU 37 and the engine ECU 48. However, the activation of the FET 41 may be controlled by another ECU, such as a shift ECU.

The fourth embodiment has the advantage as described below.

(9) The driving control of the motor 23 is performed in accordance with an output signal output from other ECUs (the verification ECU 37 and the engine ECU 48) in addition to the activation signal output from the computer 32. Therefore, the electronic steering wheel lock apparatus 1 is not actuated erroneously unless all of the ECU 31, 37, and 48 are activated erroneously. This prevents the erroneous operation of the electronic steering wheel lock apparatus 1.

Fifth Embodiment

Figure 11:
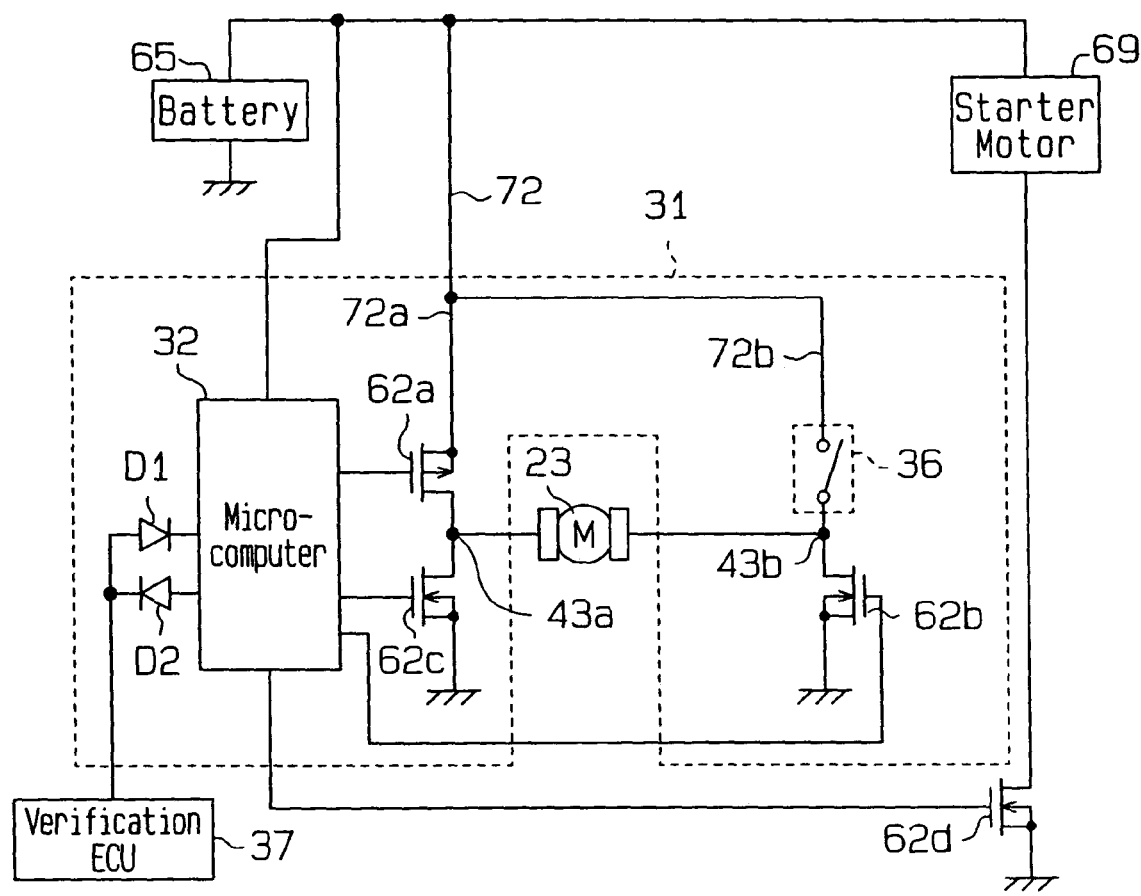
FIG. 11 is a block diagram showing an electric circuit of an electronic steering wheel lock apparatus according to a fifth embodiment of the present invention.

FIG. 11 shows a steering wheel lock apparatus 1 according to a fifth embodiment of the present invention.

In the fifth embodiment, a shift cooperation switch 36 is arranged in the second power supply line 72b in lieu of the erroneous rotation prevention switch 61. The shift cooperation switch 36 mechanically breaks the second power supply line 72b when the shift lever is located at a position other than the parking position. The shift cooperation switch 36 is arranged in the vicinity of the shift lever (not shown) and opens and closes the second power supply line 72b in cooperation with the movement of the shift lever. More specifically, the shift cooperation switch 36 is closed when the shift lever is located at the parking position and is opened when the shift lever is located at other positions. The shift cooperation switch 36 is configured by a contact-type switch, such as a limit switch or a reed switch, which opens or closes its contact in accordance with the movement of the shift lever. Further, the phrase "located at the parking position" is defined by at least one of the states in which the shift lever is located at a P position and in which a parking lock of transmission is functioning.

A parking brake cooperation switch, which is, for example, closed only when the parking brake is functioning, may be used in lieu of the shift cooperation switch 36. The shift cooperation switch 36 and the parking cooperation switch may be used together and be connected in series.

The fifth embodiment has the advantage as described below.

(10) The shift cooperation switch 36 is arranged in the second power supply line 72b and is closed only when the shift lever is located at the parking position. Therefore, the driving of the motor 23 is enabled only when the shift lever is located at the parking position and the computer 32 sends the activation signal to the FET 62c. This prevents the motor 23 from being driven even if the computer 32 outputs the activation signal to the FET 62c when the vehicle is traveling. This guarantees prevention of erroneous actuation of the electronic steering wheel lock apparatus 1 that may occur due to noise.

Sixth Embodiment

Figure 12:
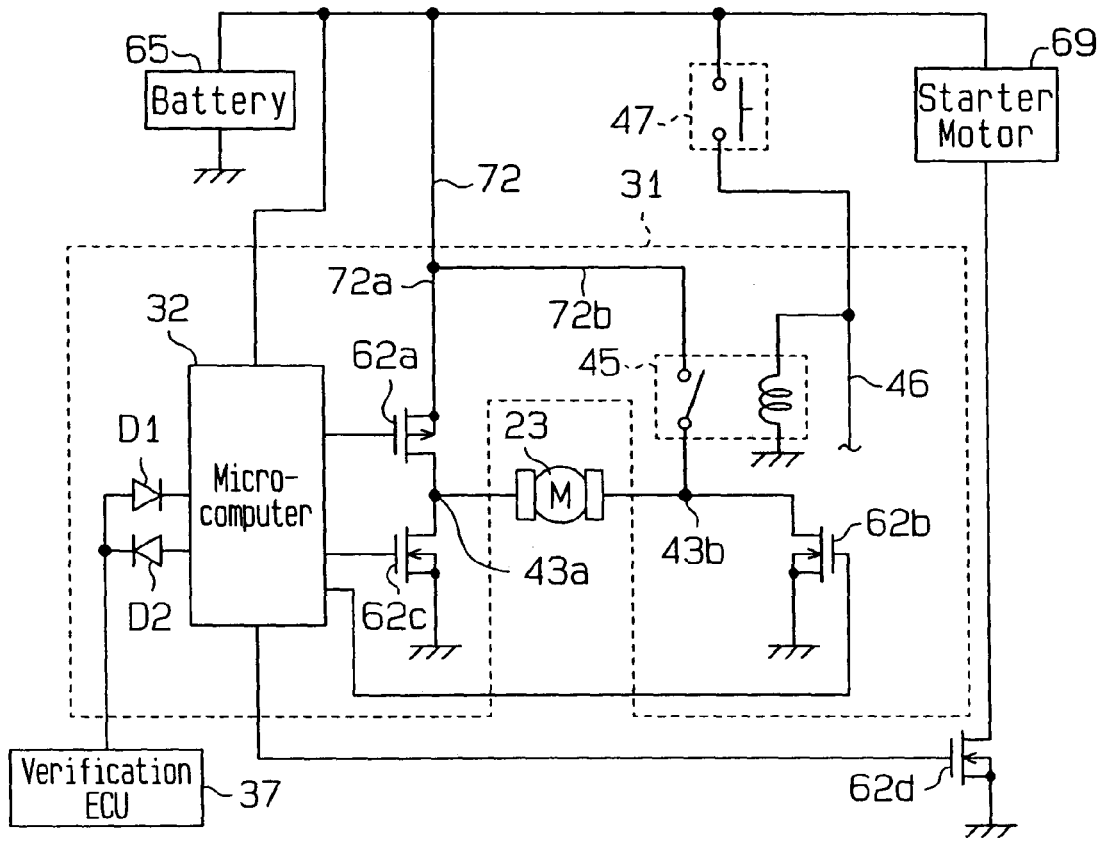
FIG. 12 is a block diagram showing an electric circuit of an electronic steering wheel lock apparatus according to a sixth embodiment of the present invention.

FIG. 12 shows a steering wheel lock apparatus 1 according to the sixth embodiment of the present invention.

The steering wheel lock apparatus 1 of the sixth embodiment includes an ignition power supply line 46, which supplies power to electric devices of the vehicle, an ignition switch 47, and a switching device 45. The ignition switch 47 and the switching device 45 configure a breaker circuit. The switching device 45 breaks the second power supply line 72b when current flows through the ignition power supply line 46, that is, when the functional position of a vehicle is shifted to the "ON" position. The phrase "the functional position of the vehicle is shifted to the "ON" position" refers to a state, in which power is supplied to an electronically fuel-injected engine controller and other electric components.

Referring to FIG. 12, a contact of a switching device, or a relay 45, is connected to the second power supply line 72b, and a coil of the relay 45 is connected to the ignition power supply line 46 in parallel. More specifically, the contact of the relay 45 is a B contact (normal close), one end of which is connected to the battery 65, and the other end of which is connected to the node 43b. Further, one end of the coil in the relay 45 is connected to one end of the ignition switch 47 and the other end of the coil is grounded. The ignition switch 47 is configured by a contact holding type switch with the other one of its end connected to the battery 65. Accordingly, when the ignition switch 47 is closed, current flows through the ignition power supply line 46, and the contact of the relay 45 is closed. Therefore, the second power supply line 72b is broken when the ignition power supply line 46 is connected. That is, in this case, the breaker circuit is configured by the ignition switch 47 and the switching device (relay 45), which breaks the second power supply line 72b of the control circuit (actuator ECU 31) when the functional position of the vehicle is shifted to the "ON" position.

In addition to functioning to shift the functional position to the "ON" position, the phrase "the ignition switch 47" includes anything functioning to start and stop the engine. Further, the switching device is not limited to a contact-type switching device, such as the relay 45, and may be a non-contact switch, such as the FET 41 or a power transistor.

The sixth embodiment has the advantage described below.

(11) When the ignition power supply line 46 is connected, the second power supply line 72b is broken. That is, since the ignition power supply line 46 is connected when the engine is running and the vehicle is traveling, prevention of erroneous operation of the electrical steering wheel lock apparatus 1 is guaranteed.

The first to sixth embodiments may be modified as described below.

In the first embodiment, the flow of current to the second power supply line 72b is mechanically broken by operating the erroneous rotation prevention switch 61. However, the connection of the second power supply line 72b may be mechanically broken by inserting a key plate and directly moving the movable contact 74 with the distal end of the key plate.

In the first embodiment, the cooperation rod 73 may be moved in cooperation with a key plate in lieu of the ignition switch knob 81.

Figure 13A:
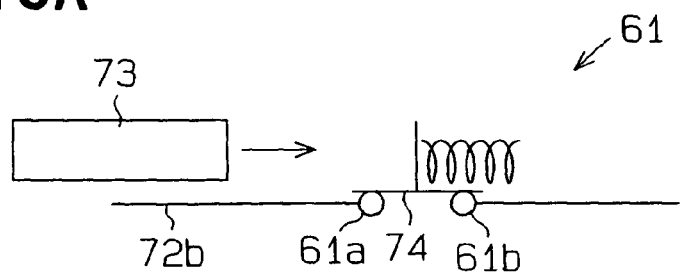
FIGS. 13A and 13B are modifications of the erroneous rotation prevention switch.
Figure 13B:
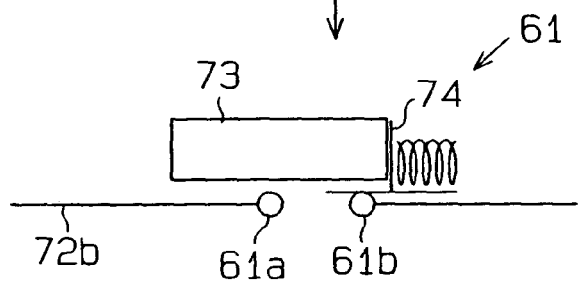

Referring to FIGS. 13A and 13B, the connection of the second power supply line 72b may be broken by sliding the movable contact 74 of the erroneous rotation prevention switch 61 in the same direction as the moving direction of the cooperation rod 73.

In the first embodiment, the FET 62c may be arranged upstream of the motor 23 in the second power supply line 72b, and the erroneous rotation prevention switch 61 may be arranged downstream of the motor 23 in the second power supply line 72b.

In the third embodiment, the lock position detection switch 38 and the resistor R2 (the electric circuit E1 shown in FIG. 6) may be connected to the computer 32 in the same manner as in the second embodiment. This would stop continuous driving of the motor 23 when the lock pin 21 is engaged with or disengaged from the socket 5a. Thus, advantage (6) of the second embodiment is obtained. Further, the electric circuit E1 may be connected to the computer 32 in the following modifications.

Figure 14:
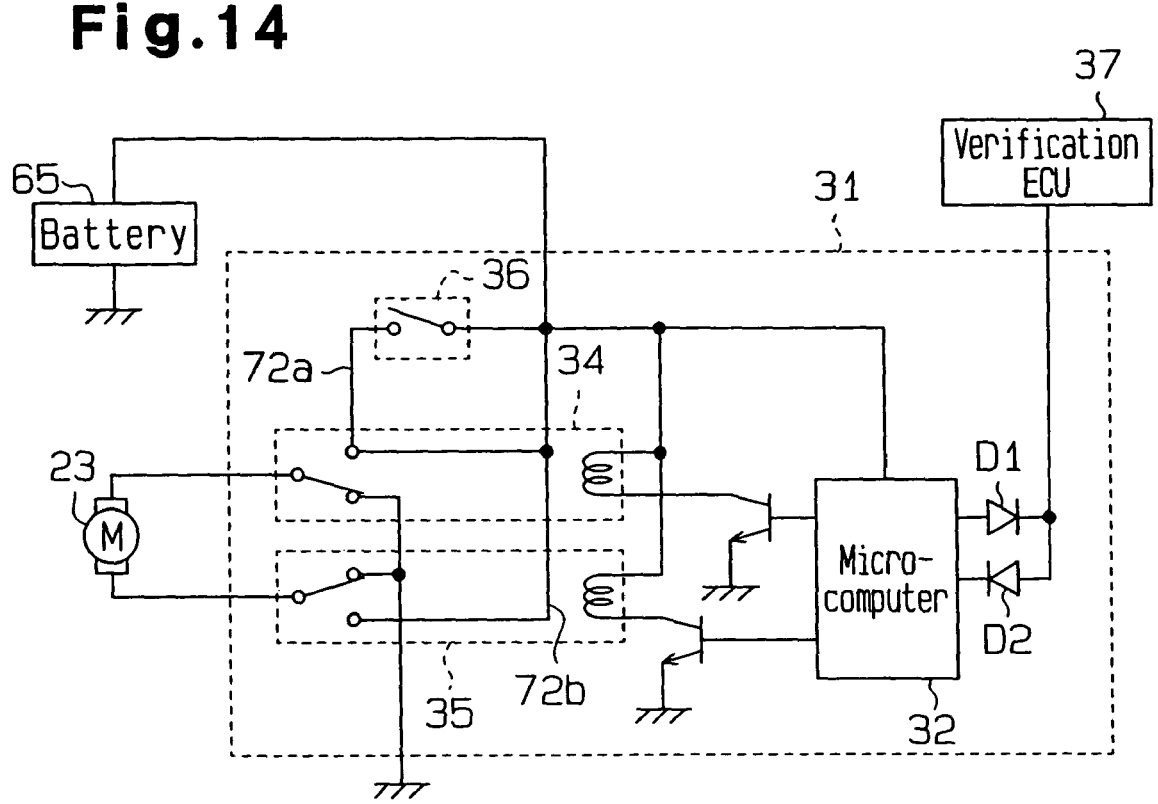
FIG. 14 is a block diagram showing an electric circuit of an electronic steering wheel lock apparatus according to another embodiment of the present invention.
Figure 15:
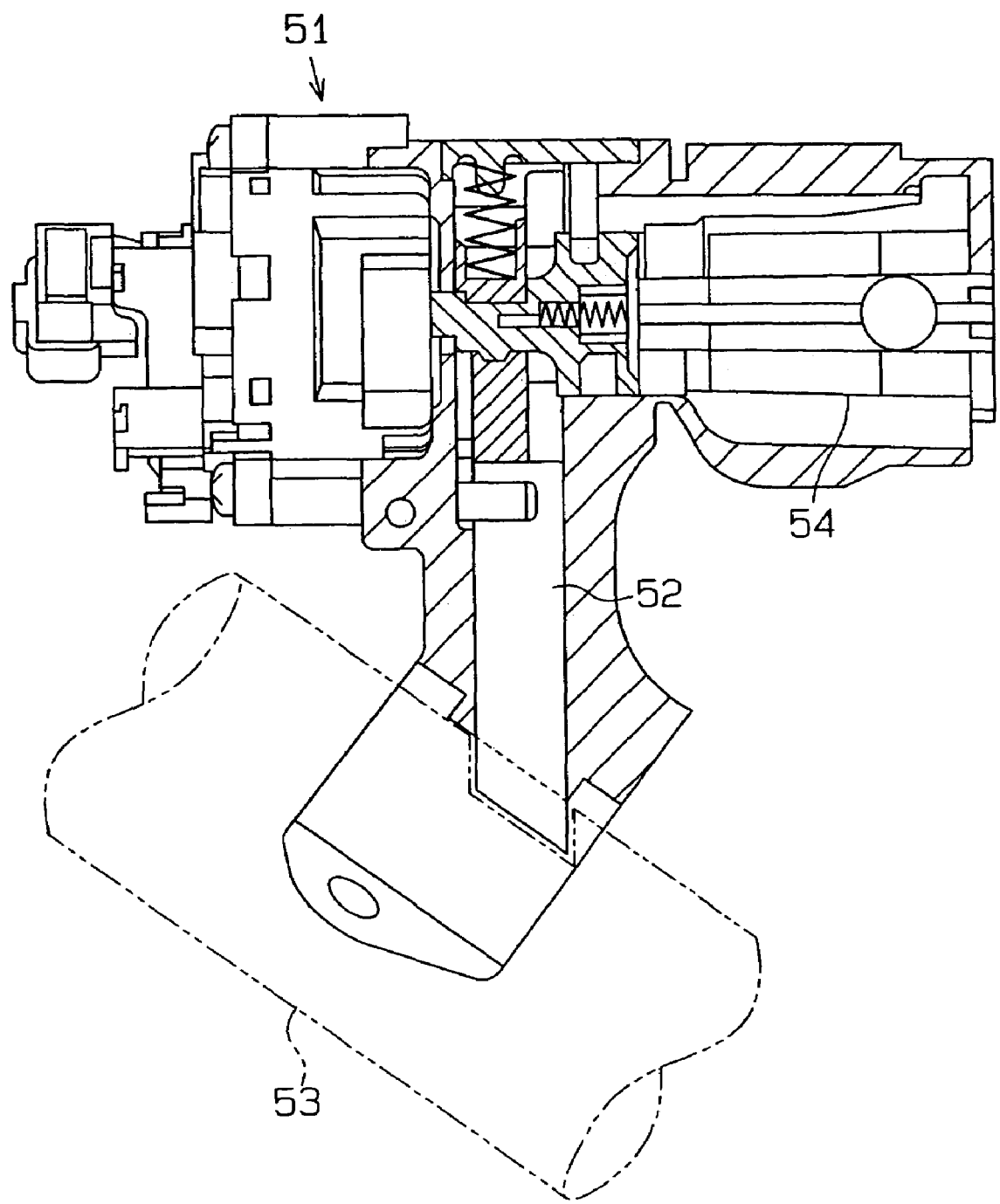
FIG. 15 is a cross-sectional view of a prior art steering wheel lock apparatus.

In each of the embodiments, the FETs 62a to 62c are used as the non-contact switching devices. However, the contact switching devices, such as the relays 34 and 35, may be used, as shown in FIG. 14. In this case, the first power supply line 72a is an electric line, through which current flows in the order of the battery 65, the relay 34, the motor 23, and the relay 35. The second power supply line 72b is an electric line, through which current flows in the order of the battery 65, the relay 35, the motor 23, and the relay 34.

In each of the embodiments, the engine starts and stops by operating the switch knob 82 (engine start/stop switch), which is arranged in the vehicle. Accordingly, the switch knob 81 may be a typical key cylinder. In this case, a mechanical key is inserted into the key cylinder and rotated to start and stop the engine. For example, the erroneous rotation prevention switch 61 of the first embodiment may be changed to a key cooperation switch, which breaks the second power supply line 72b when the mechanical key is inserted in the key cylinder. It is preferred that the verification ECU 37 verify the ID codes and release the lock before the mechanical key is inserted in the key cylinder. In a specific example, the lock position detection switch 38 shown in the second embodiment is connected to the key cooperation switch in parallel. The breaker circuit includes the key cooperation switch, which breaks the second power supply line 72b when the starting of the engine is enabled and connects the second power supply line 72b when the starting of the engine is disabled.

The lock position detection switch 38 of the second embodiment is a limit switch, but may be a contact-type switch, such as a reed switch, which opens or closes its contact in accordance with the position of the lock pin 21.

In the second embodiment, the computer 32 detects the opened or closed state of the lock position detection switch 38 and stops driving the motor when the opened or closed state of the lock position detection switch changes. The computer 32 does not have to detect the opened or closed state of the lock position detection switch 38.

In the third embodiment, the FET 41 may be provided with a signal, from which the driving state of the engine is detectable, such as vehicle velocity or alternator output, instead of the ignition signal.

In the third embodiment, a driving circuit E2, which is configured by the AND circuit 42, the resistor R1, and the capacitor C, is connected to the gate terminal of the FET 41. However, the output terminal of the AND circuit 42 in the drive circuit E2 may be connected to the gate terminal of the FET 62c, or the section indicated by P1 in FIG. 8.

In each of the embodiments, the FETs 62a to 62c are used as the switching device. However, bipolar transistors or ICs may be used as the switching device in lieu of the FETs 62a to 62c.

In each of the embodiments, the motor 23 is used as an actuator. However, the actuator is not limited to the motor 23, and anything that drives the lock pin 21, such as a solenoid or an air cylinder may be used.

In each of the embodiments, the verification of the ID codes is performed by a smart ignition system that processes a transmission signal transmitted from the portable device by radio waves. However, the portable device may be changed to a key having an IC chip and the ID codes may be verified by a transponder that processes the signal, which is transmitted when the key is inserted in a key cylinder. In this structure, the power source of the portable device may be omitted.

In each of the embodiments, the electronic steering wheel lock apparatus 1, which controls the rotation of the steering shaft 5, is embodied as an electronic anti-theft apparatus. However, the electronic anti-theft apparatus may be an electronic travel restriction apparatus that restricts the rotation of a wheel, or an electronic shift lock apparatus that restricts the shifting operation of the shift lever with a locking means corresponding to the lock pin 21.

The invention claimed is:

1. An electronic vehicle anti-theft apparatus for preventing theft of a vehicle, comprising:
   a locking means for selectively locking a movable component that is operated when the vehicle is being driven;
   an actuator for moving the locking means; and
   a control circuit for controlling the actuator, the control circuit including a first power supply line for supplying the actuator with unlocking current that unlocks the movable component, a second power supply line for supplying the actuator with locking current that locks the movable component and a breaker circuit arranged in the second power supply line for breaking the second power supply line but not the first power supply line when the vehicle is started;
   wherein the breaker circuit includes a cooperation member, which moves in cooperation with a switch operated by a user when starting the vehicle, and a movable contact, which is moved in accordance with the cooperation member to selectively break the second power supply line.

2. The electronic vehicle anti-theft apparatus according to claim 1, wherein the control circuit further includes an upstream switching device and a downstream switching device, which are arranged in the first power supply line, and a second switching device, which is arranged in the second power supply line, and the actuator is connected to a node between the upstream switching device and the second switching device, and to the downstream switching device.

3. The electronic vehicle anti-theft apparatus according to claim 2, wherein the switch includes a switch knob.

4. The electronic vehicle anti-theft apparatus according to claim 2, wherein the actuator is connected to a node between the downstream switching device and the breaker circuit.

5. The electronic vehicle anti-theft apparatus according to claim 4, wherein in the first power supply line, the upstream switching device, the actuator, and the downstream switching device are connected in series, and in the second power supply line, the breaker circuit, the actuator, and the second switching device are connected in series.

6. The electronic vehicle anti-theft apparatus according to claim 1, wherein the breaker circuit includes an electric switching device, which electrically opens and closes the second power supply line, and a drive circuit, which drives the electric switching device, the drive circuit opening the second power supply line when the vehicle is started by controlling the electric switching device and closing the second power supply line when the vehicle is stopped by controlling the electric switching device.

7. The electronic vehicle anti-theft apparatus according to claim 6, wherein the control circuit includes a computer that provides a drive permission signal to the drive circuit when starting of the vehicle is enabled, the drive circuit outputting the drive permission signal and an activation signal to the electric switching device in accordance with an ignition signal indicating a driving state of the vehicle.

8. The anti-theft apparatus according to claim 1, wherein the breaker circuit is a mechanical switch that mechanically opens the second power supply line when the vehicle is being driven.

9. An electronic vehicle anti-theft apparatus for preventing theft of a vehicle, comprising:
   a locking means for selectively locking a movable component that is operated when the vehicle is being driven;
   an actuator for moving the locking means; and
   a control circuit for controlling the actuator, the control circuit including a first power supply line for supplying the actuator with unlocking current that unlocks the movable component, a second power supply line for supplying the actuator with locking current that locks the movable component, a breaker circuit arranged in the second power supply line for breaking the second power supply line but not the first power supply line when the vehicle is started and a second switching device arranged in the second power supply line;
   wherein the breaker circuit and the second switching device are independently switchable.

10. An electronic vehicle anti-theft apparatus for preventing theft of a vehicle, comprising:
    a locking means for selectively locking a movable component that is operated when the vehicle is being driven;
    an actuator for moving the locking means; and
    a control circuit for controlling the actuator, the control circuit including a first power supply line for supplying the actuator with unlocking current that unlocks the movable component, a second power supply line for supplying the actuator with locking current that locks the movable component, and a breaker circuit arranged only at an upstream location of the actuator in the second power supply line for breaking the second power supply line but not the first power supply line when the vehicle is started.

11. An electronic vehicle anti-theft apparatus for preventing theft of a vehicle, comprising:
    a locking means for selectively locking a movable component that is operated when the vehicle is being driven;
    an actuator for moving the locking means; and
    a control circuit for controlling the actuator, the control circuit including a first power supply line for supplying the actuator with unlocking current that unlocks the movable component, a second power supply line for supplying the actuator with locking current that locks the movable component; and
    a breaker circuit, arranged in the second power supply line and controlled by a controller that is different from the control circuit, for breaking the second power supply line but not the first power supply line when the vehicle is started.

* * * * *